United States Patent

Foster

[15] 3,653,269

[45] Apr. 4, 1972

[54] CONVERTING ROTARY MOTION INTO UNIDIRECTIONAL MOTION

[72] Inventor: Richard E. Foster, 5342 Sycamore Street, Baton Rouge, La. 70805

[22] Filed: May 15, 1970

[21] Appl. No.: 37,661

[52] U.S. Cl. .................................................................74/84
[51] Int. Cl. .........................................................F16h 27/00
[58] Field of Search .............................74/84 S, 84; 244/1 SB

[56] References Cited

UNITED STATES PATENTS 3,555,915   1/1971   Young, Jr. ..................................74/84

FOREIGN PATENTS OR APPLICATIONS 770,555   3/1957   Great Britain ..............................74/84

*Primary Examiner*—Milton Kaufman
*Attorney*—John F. Sieberth

[57] ABSTRACT

Unidirectional thrust and consequent unidirectional motion are achieved by rotating thrust producing units in a circular orbit. The thrust producing units involve weights or masses which are caused to accelerate in the direction of the orbital travel during all or a portion of the one-half of the orbital travel which is away from the direction of the desired thrust. The reaction to this acceleration occurs and manifests itself at an orbital location—i.e., away from the axis of rotation—and provides the unidirectional thrust. During the one-half of the orbital travel which is toward the direction of the desired thrust there either is no such acceleration or the reaction to such acceleration is directly transferred to the axis of rotation, and consequently in either case no reaction is manifested at an orbital location. Hence, there is no thrust in the direction opposite that desired.

10 Claims, 7 Drawing Figures

PATENTED APR 4 1972

INVENTOR.
RICHARD E. FOSTER

BY John A. Rieberth

ATTORNEY

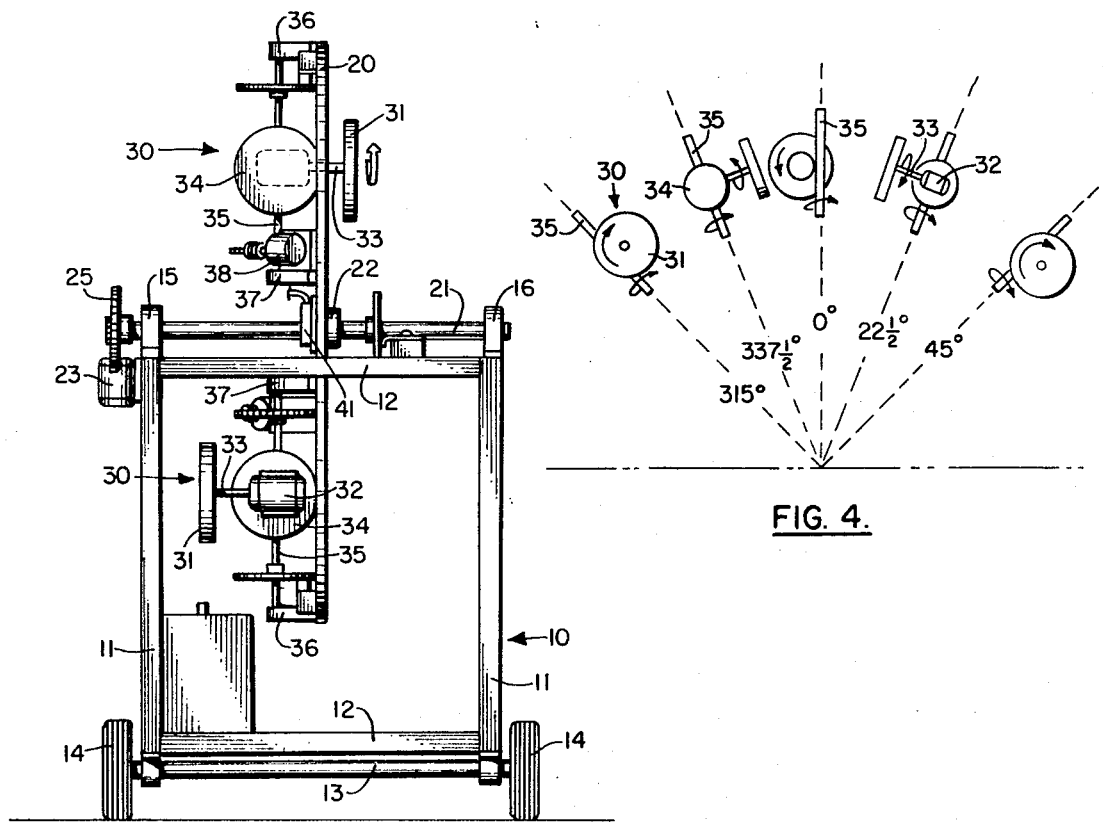
FIG. 3.
FIG. 4.
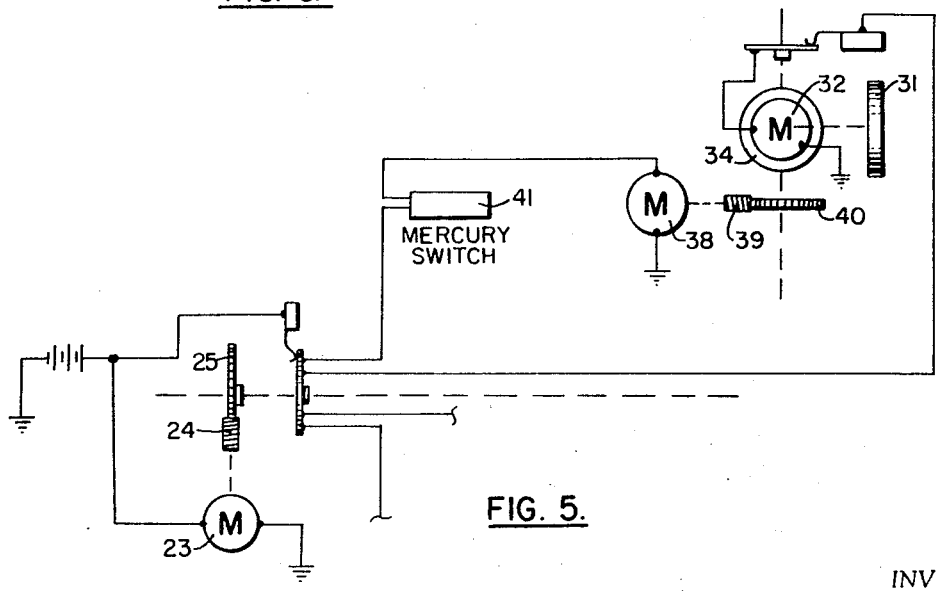
FIG. 5.
INVENTOR.
RICHARD E. FOSTER

INVENTOR.
RICHARD E. FOSTER
BY
ATTORNEY

CONVERTING ROTARY MOTION INTO UNIDIRECTIONAL MOTION

FIELD OF THE INVENTION

This invention relates to driving systems for producing unidirectional motion. More particularly, this invention is concerned with a propulsion system in which rotational movement is transformed into unidirectional motion which may be continuous or intermittent and in which the direction of the unidirectional motion may be fixed or varied.

Various uses to which such systems may be put are indicated, for example, in U.S. Pat. No. 2,886,976 and *Popular Mechanics*, Volume 116, No. 3, pp. 131 et. seq. (September 1961). Of particular interest is the application of these systems to vehicles (prime movers) which may carry a load from one place to another without need for external propulsion members such as drive wheels, propellers, jet engines, rockets, or the like. This invention provides systems in which a unidirectional thrust may be produced wholly within the confines of the vehicle and whereby, as a consequence, unidirectional motion of the vehicle is achieved.

SUMMARY OF THE INVENTION

In accordance with this invention the prime mover is provided with one or more rotatably suspended members (e.g., arms, wheels or discs, endless belts or the like) each of which can be caused to rotate about an axis within or in proximity to the general confines of the vehicle itself. Thrust producing means are carried by and rotatable with the rotatable member(s) and the thrust producing means exert, when actuated, a thrust in a direction generally opposite to the direction in which they are being carried at any given time by the rotating member(s). Unidirectional thrust is achieved by actuating the thrust producing means when the thrust is in the direction selected for travel. When the thrust would be in the direction opposite to that selected for travel, the thrust producing means are deactuated so they produce no thrust or their thrust is utilized in the system to effect braking (slowing down or stopping). Accordingly, in the systems of this invention rotary motion is converted into unidirectional thrust, and the unidirectional thrust causes or is translated into unidirectional movement of the prime mover.

A feature of the invention is that the thrust producing means, when actuated, actually move weights or masses in the same general direction as they are rotating or orbiting. This movement occurs during 180° or less of rotation when the thrust producing means are rotating away from the direction in which the thrust is desired (movement in the opposite direction during a portion of said 180° of rotation is permissible). The reaction from this movement in the general direction of rotation manifests or exerts itself at a location removed from the axis of rotation and thereby creates thrust in the desired direction. Reaction from movement, if any, in the direction opposite to rotation during a portion of said 180° of rotation is utilized or dissipated in assisting in the rotational movement and thus does not create an equal thrust in the undesired direction. Hence, during this 180° of rotational travel the thrust is produced, and is exerted in the desired direction.

During the other 180° of rotation (when the thrust producing means are rotating toward the direction in which the thrust is desired) the thrust producing means are deactuated in the sense that they do not produce a thrust in either direction. One way of accomplishing this is to keep the weights stationary (except for rotation) during this 180° of rotational travel (i.e., the weight only rotates with the wheel or other member carrying it around the axis—it does not change its position relative to the wheel). The system illustrated in FIGS. 1 through 5 utilizes this principle. Another way of achieving this deactuation is to only move the weights in the direction opposite to rotation during this 180° of rotational travel, a principle used in the system of FIGS. 6 and 7. Still another way of obtaining this deactuation is to cause the weights to alternately move toward and against the direction of rotational travel during this 180° provided that the reaction to the movement toward the direction of rotation is simultaneously transferred directly to the axis or hub of the rotation—i.e., the reaction is not permitted to manifest or exert itself at a location removed from the axis of rotation. This may be accomplished, for example, by revising the gear ratio in FIGS. 6 and 7 so the weights oscillate more than one complete cycle per revolution of the wheel and keeping the clutch engaged during the full 180° when the weight associated therewith is rotating toward the direction of desired thrust. This effectively and immediately neutralizes the reactionary force which would otherwise create a thrust away from the desired direction. In any event, irrespective of the precise mode of operation selected for use in the system, during this 180° of rotational travel the deactuation of the thrust producing means prevents it from generating a thrust in the undesired direction.

It will now be evident that during all or a portion of 180° of rotation by a given thrust producing unit it generates a thrust in one general direction whereas during the remaining 180° of rotation it produces no thrust which would cause motion in the undesired direction. Where two such means are spaced at 180° intervals on a wheel, each may be alternately actuated throughout the same 180° of travel so that a thrust in the same direction is being generated more or less continuously, first by one thrust unit and then by the other.

The above and other features, aspects, embodiments, objects, advantages and characteristics of this invention will become still further apparent from the ensuing description, appended claims, and accompanying drawings.

BRIEF SUMMARY OF THE DRAWINGS

FIG. 3 is an end elevation of the vehicle of FIG. 1 viewed along line 3,3 thereof;

FIG. 4 illustrates in schematic fashion the triaxial motion involved when causing the vehicle of FIG. 1 to be driven in the direction of arrow M;

FIG. 5 depicts schematically the electrical circuitry which may be employed in the system of FIG. 1;

DESCRIPTION OF PREFERRED EMBODIMENTS

As can be seen from the Figures, this invention provides in one of its practical fundamental aspects a system for converting rotary motion into unidirectional motion which comprises:

a. a wheel rotatable about an axis;

b. thrust producing means carried by and rotatable with the wheel and exerting, when actuated, a thrust in a direction generally opposite the direction of its rotational travel; and c. means alternately actuating and deactuating the thrust producing means to yield thrust in the direction selected for the unidirectional motion of the system.

Another way of looking at this invention is that the thrust producing units involve weights or masses which are carried in a circular orbit. When the orbital travel is away from the direction of the desired thrust the weights or masses are caused to accelerate in the direction of the orbital travel—i.e., during all or a portion of the time that each given weight or mass is travelling in a semi-circle away form the direction in which the thrust is desired, it is caused to move faster in the direction of its orbital travel than the speed of its orbital movement. On the other hand, during the time that each given weight or mass is travelling in a semi-circle toward the direction in which the thrust is desired, it is caused to move in the direction of its orbital travel either at the speed or at less than the speed of its orbital movement, or it is permitted during part of this time to move faster than the speed of its orbital travel but when it does so, its reactionary force is neutralized by direct simultaneous physical transfer to the center of the orbit. The net result of these coordinated relative motions is the provision of unidirectional thrust and unidirectional motion in the preselected or desired direction. More particularly, when the weight is caused to accelerate in the direction of the orbital travel during all or a portion of the time it is orbiting in the semi-circle leading away from the direction in which the unidirectional thrust is desired, the reaction to this acceleration occurs and manifests itself at an orbital location—i.e., away from the axis of rotation—and provides the unidirectional thrust. During the one-half of the orbital travel which is toward the direction of the desired thrust there is no such acceleration and consequently no reaction manifested at an orbital location. Hence, there is no thrust in the direction opposite that desired.

Figure 1:
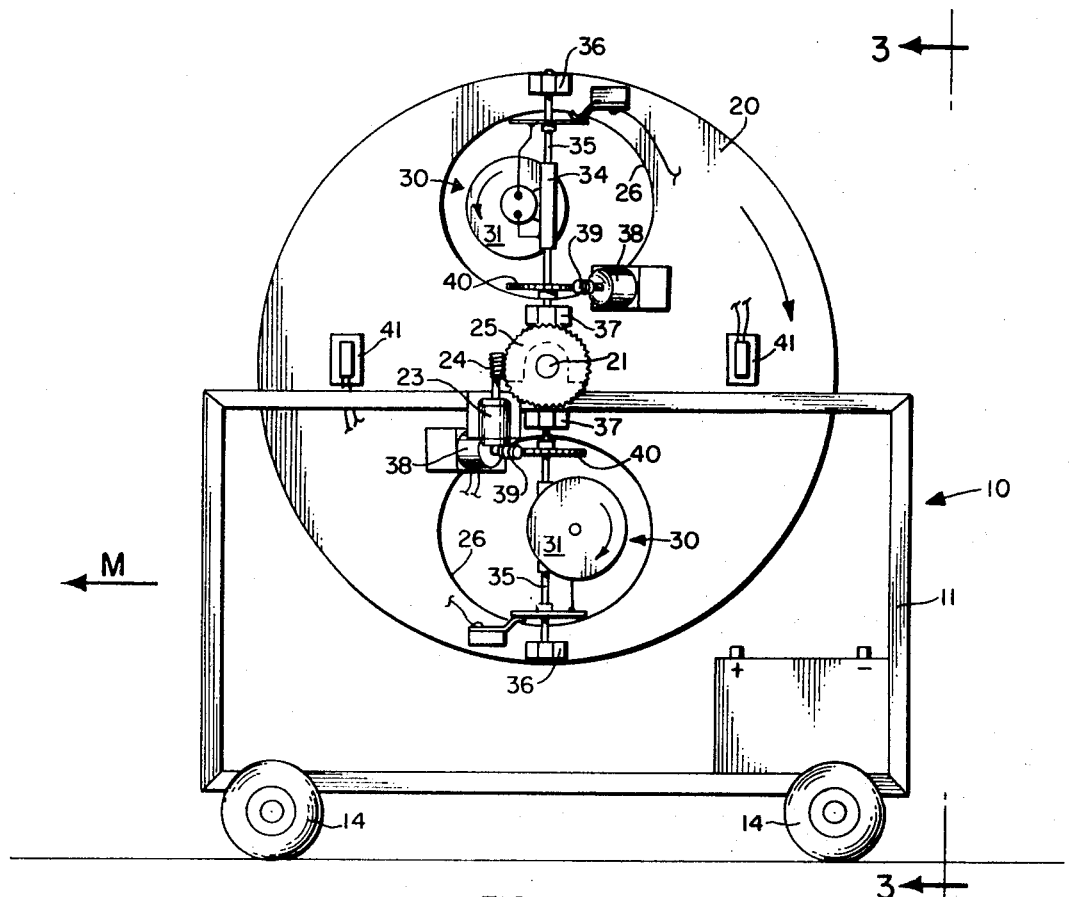
FIG. 1 is a partially schematic side elevation of a vehicle equipped with a system of this invention developing unidirectional thrust by use of rotatable masses (e.g., inertia wheels) each of which is subjected to continuous rotation about its own axis, continuous rotation about another axis, and periodical rotation about still another axis.
Figure 6:
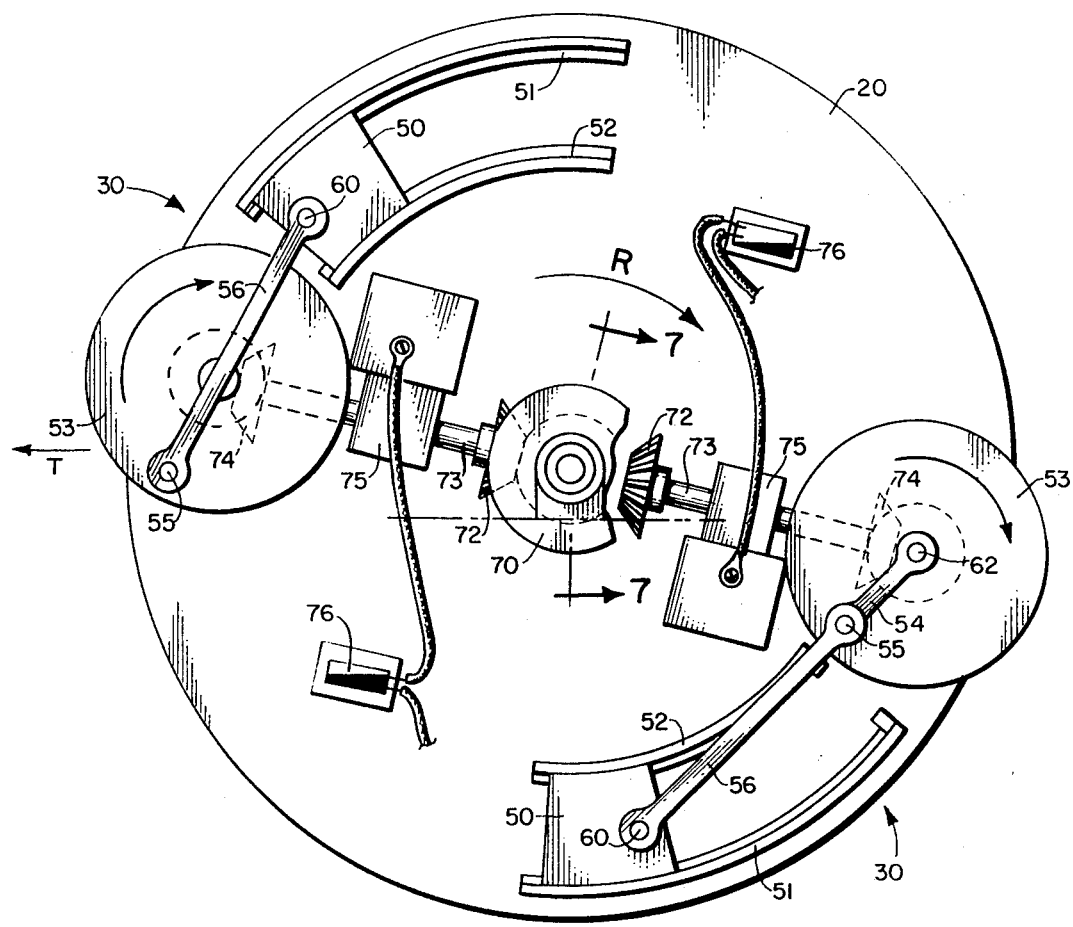
FIG. 6 is a partially schematic view of another embodiment of this invention in which unidirectional thrust is produced by use of oscillatable masses (e.g., weighted pistons) each of which is subjected to continuous rotation about a central axis, is actuated so that it produces a reactionary thrust when rotatably travelling in a direction generally opposite or away from that selected for the unidirectional thrust desired, and is deactuated so that it does not produce a reactionary thrust when rotatably travelling in a direction generally concurrent or toward that selected for the unidirectional thrust desired.

For best results, the thrust producing means or units are positioned in proximity to the periphery of the wheel, a feature illustrated for example in FIGS. 1 and 6. In addition, it is desirable to utilize a plurality of thrust producing means, and further, to position them at essentially equal angular intervals on the wheel. Thus, in the systems of FIGS. 1 and 6 two thrust producing units are employed, and these are positioned at about 180° intervals with respect to each other. However, the wheel may be equipped with as many thrust producing units as it will conveniently accommodate.

EMBODIMENT INVOLVING ROTATED SPINNING WEIGHTS

Referring more particularly to the embodiment depicted in FIGS. 1 through 5, a carriage referred to generally by the numeral 10 is composed of side frames 11, cross braces 12, axles 13 and wheels 14. Disc or wheel 20 is rotatably supported or suspended within carriage 10 by means of axle 21 and axle supports 15 and 16. Flange 22 connects wheel 20 with axle 21. Rotation of wheel 20 about its axis is effected by means of motor 23, endless screw 24 and wheel gear 25, this worm gear arrangement transmitting rotary motion to axle 21 and wheel 20 mounted thereon.

Supported on wheel 20 in association with cutaways 26 are thrust producing units designated generally by the numeral 30. Each such unit — best seen in FIG. 2 — is composed of an inertia wheel 31 supported on and rotated by shaft 33 of motor 32, this entire sub-assembly in turn being carried on plate 34 mounted on spindle 35 which is rotatably supported on wheel 20 by means of brackets 36, 37. Rotation of spindle 35 is effected by motor 38, endless screw 39 and wheel gear 40.

Figure 2:
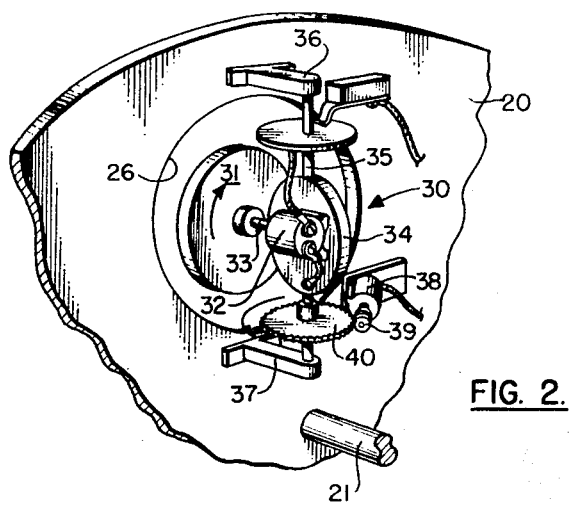
FIG. 2 is an enlarged view of one of the biaxial rotational thrust producing units of the system of FIG. 1.

As is evident from FIGS. 1 through 3 and especially FIG. 5, during operation electrical power is supplied continuously to each one of the motors 23 and 32 thereby conferring continuous axial rotation to wheel 20 and to each inertia wheel 31. On the other hand, the power supply to each motor 38 is limited by means of individual mercury switches 41. Thus in the embodiment shown electrical contact is made while switch 41 is carried through the left-hand 180° segment (i.e., from 180° to 360°) of axial rotation by wheel 20. In other words each motor 38 runs only when it is in the upper half of its circular trip around the axis of wheel 20.

FIG. 4 facilitates an explanation of the manner by which the thrust producing units of the embodiment of FIGS. 1 through 5 function during operation. For the purposes of illustration, it is assumed in FIG. 4 that motor 38 (not shown) causes spindle 35 and the parts carried thereby (plate 34, motor 32, inertia wheel 31) to make two complete revolutions about the longitudinal axis of spindle 35 during the time wheel 20 (not shown) makes one-half of a revolution about its axis. It is also assumed that the motor 38 of the system schematically depicted in FIG. 4 is actuated only during the time it is travelling through the top semi-circular arc defined by clockwise rotation of wheel 20—i.e., assigning zero degrees to the apex of the circular travel of motor 38, motor 38 is energized as it passes from 270° to 90°. During this same period of time motor 38 of the other thrust producing unit 30 (not shown in FIG. 4, but see FIG. 1) is not actuated. Thus each motor 38 is powered only when travelling from 270° to 90° (or 9 o'clock to 3 o'clock). These motors therefore operate alternately-- first one, then the other, etc.

Referring to FIG. 4, as the depicted thrust producing unit 30 travels from 315° to 337.5° the axially spinning inertia wheel 31 is moved clockwise relative to spindle 35. The action of forcing inertia wheel 31 out of the plane of its axial rotation gives rise to a reaction in the opposite direction and results in a unidirectional thrust being produced. In actual practice this thrust pushes the carriage to the left (note arrow M of FIG. 1). Throughout the next 45° of rotational travel (i.e., from 337.5° to zero and thence to 22.5°) the axially spinning inertia wheel 31 is being moved counter-clockwise relative to spindle 35 and the reaction to this relative motion is dissipated by clockwise rotation of wheel 20. During travel from 22.5° to 45° the relative motion of the axially spinning inertia wheel 31 is again clockwise relative to spindle 35 and accordingly the unidirectional thrust produced by the reaction to this relative motion again forces the carriage to the left. The result of these rapid changes in relative motion is that the vehicle is propelled, in this case to the left. By reversing the direction of rotation of wheel 20 and confining the actuation of motor 38 to the upper half of its circular trip with wheel 20 (i.e., from 3 o'clock through 12 o'clock and to 9 o'clock), the unidirectional thrust would be exerted generally toward the right hand side of FIG. 4. Similarly, clockwise rotation of wheel 20 with actuation of motor 38 only from 90° to 270° (i.e., through the bottom half of its circular trip with wheel 20) gives a unidirectional thrust and resultant unidirectional motion of the vehicle toward the right whereas counter-clcokwise rotation of wheel 20 with actuation of motor 38 from 9 o'clock through 6 o'clock to 3 o'clock produces a unidirectional thrust toward the left.

A feature of the embodiment of FIGS. 1 through 5 is that there is a significant reaction or unidirectional thrust produced when the spinning inertia wheels 31 are moved out of their axial planes of rotation and in a direction generally opposite that selected for travel by the vehicle. The magnitude of this force will readily be appreciated by anyone who has sought to move a gyroscope out of its plane of axial rotation. Indeed, the substantial resistance to such movement is the operative principle behind the use of gyroscopes to confer stability upon ships and other craft normally susceptible to undesired rotary motion. Another feature of this embodiment is the fact that the gyroscopic action resulting from the axial spin of inertia wheel 31 tends rapidly to overcome the rotational momentum or inertia produced by rotating spindle 35 and the parts carried thereby. Thus, as the electrical power is cut off from motor 38 by its mercury switch 41 any tendency for further inertial rotation of spindle 35 and the parts mounted thereon about the longitudinal axis of the spindle is rapidly overcome by this gyroscopic action of inertia wheel 31 and as a consequence, thrust in an undesired direction is not encountered to any significant extent.

EMBODIMENT INVOLVING ROTATED OSCILLATING WEIGHTS

Figure 7:
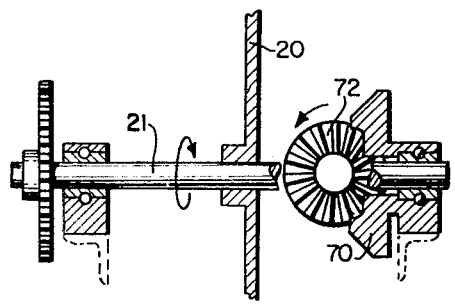
FIG. 7 is an enlarged fragmented view taken along 7,7 of FIG. 6 and illustrating the gearing which may be employed in the system of FIG. 6.

The system depicted in FIGS. 6 and 7 involves use of linearly oscillating weights carried in a circular plane—i.e., weights are shifted back and forth, more or less tangentially with respect to a circular orbit in which they are carried on a rotating wheel. More particularly, wheel 20 of this system, which may be substituted for wheel 20 in the vehicle of FIG. 1, contains, for purposes of illustration, two thrust producing units 30. In each of these units slidable weight 50 is mounted in guide rails 51,52 and connected to shaft 62 by means of arms 54 and 56 pivotally connected to each other at 55, the longer arm 56 being in turn pivotally connected to weight 50 by pin 60 and the free end of arm 54 being connected to the end of shaft 62 on which flywheel 53 is axially mounted. Mounted on the carriage in proximity to the center of wheel 20 is stationary gear 70 which operatively engages each gear 72 in a bevel gear arrangement. Gears 72 are carried on the inner ends of shafts 73, each of which leads through an electromagnetically operated clutch 75 to a set of bevel gears 74 and a shaft 62. Rotation of wheel 20 and the thrust producing units 30 carried thereby causes axial rotation of each gear 72 and each shaft 73. With clutch 75 engaged, this rotary motion turns bevel gears 74, shaft 62 and flywheel 53. Rotation of shaft 62 in turn is translated through arms 54 and 56 into slidable motion of weight 50 in the channel defined by guide rails 51,52. Electromagnetically operated clutch 75 makes and breaks physical connection between the ends of shaft 73 in response to signals from a monitor 76 such as a mercury switch, a remotely controlled relay switch, or the like. Ordinarily (e.g., if not braking the system) this is an alternating operation whereby one clutch is disengaged so that its thrust producing unit 30 is actuated whereas the other clutch is engaged so that its thrust producing unit is not actuated. During start-up and idle (when no unidirectional thrust is desired) both clutches may be engaged at the same time. The gearing of the system as depicted in FIGS. 6 and 7 is such that one full revolution of wheel 20 results in one full revolution of each flywheel 53 and one complete oscillatory cycle of travel by both slidable weights 50. In other words, as wheel 20 in FIG. 6 moves clockwise 180° the two thrust producing units 30 exchange places and each assumes the posture depicted for the other. Accordingly, the slidable weight 50 shown in the upper left of FIG. 6 in retracted position moves to the lower right and assumes the extended position. Conversely, the slidable weight 50 shown in the lower right of FIG. 6 in extended position moves to the upper left and assumes the retracted position. Continued rotation of wheel 20 through the remaining 180° to complete the one full revolution thereof causes both slidable weights 50 to reassume the positions as shown, and therefore these weights have travelled one cycle, i.e., one travels from the retracted to the extended and back to the retracted position while the other travels from the extended to the retracted and back to the extended position.

As in the case of the system of FIGS. 1 through 5, the system of FIGS. 6 and 7 normally involves actuation of each individual thrust producing unit only when it is moving generally away from the direction toward which the thrust is desired, in this case actuation involving, inter alia, disengagement of clutch 75. For example, when thrust in the general direction of arrow T is desired, wheel 20 may be rotated clockwise per arrow R by power supplied from motor 23 (not shown in FIG. 6 but see FIG. 1) to axle 21. Since the gears 72 and their respective shafts 73 are carried in an orbit by rotating wheel 20, this orbital movement of gears 72 in the direction of arrow R and their engagement with stationary gear 70 cause gears 72 and shafts 73 to axially rotate. If the clutches 75 are both engaged the power train is such that both of the slidable weights 50 are driven back and forth in the channels of guide rails 51,52 by energy coming from the axis around which wheel 20 is rotating, and there is no sustained unidirectional thrust in any direction. In short, the actions and reactions to the accelerations and decelerations of the weights tend to cancel each other. However, this operation does store up rotational or inertial energy in each flywheel 53. To achieve the desired thrust in the desired direction (arrow T), the appropriate thrust producing unit 30—i.e., the unit in which slidable weight 50 goes from a retracted to an extended position during the upper half of its circular travel with wheel 20—is actuated by disengaging its electromagnetically operated clutch 75. This particular thrust producing unit is being moved (rotated) generally away from arrow T (the direction of the desired thrust and motion) during this upper half of its circular travel. Because its clutch 75 is disengaged, the force imposed on its slidable weight causing the same to move clockwise more rapidly than the rest of the system is supplied by its flywheel 53 which thus serves as a source of kinetic energy. In other words, disengagement of a clutch enables the flywheel of the same unit to assume the role of a freely rotating inertia wheel and this energy source is positioned at a location remote from the axis around which wheel 20 is rotating. Consequently, actuation of this thrust producing unit by disengaging its clutch at a time when the unit is rotating away from arrow T and when the unit is thrusting its weight away from arrow T causes a switch in the source of kinetic energy for the unit, the source being switched from the axis of rotation to a locus on wheel 20 away from this axis. The result is the generation of unidirectional thrust tending to drive the vehicle toward the left per arrow T. During this same period of time, the clutch associated with the other thrust producing unit (which is going from an extended to a retracted position during the lower half of its circular travel with wheel 20) is engaged. Because its clutch is engaged, this unit is deactuated and a thrust in the direction opposite to arrow T is therefore avoided.

VARIATIONS AND FURTHER EXEMPLIFICATIONS

It will not be apparent that the systems of this invention may be utilized and operated in various ways. For example, a vehicle may be equipped with a single wheel 20 mounted in a fixed vertical plane and by actuating the appropriate thrust producing units 30 at the appropriate time the unidirectional thrust produced within the vehicle may be exerted in any direction. Thus, by rotating wheel 20 clockwise and actuating the thrust producing units (whether there be one, two, three, four, or more of them) only when they travel from 12 o'clock to 6 o'clock, the thrust is upwards. By changing the actuation so that it occurs only when the thrust producing units are traveling from 6 o'clock to 12 o'clock, the thrust is downwards. In short, thrust in any direction of the plane (anywhere throughout 360°) is possible. Also, by suitably altering the actuation of such a system braking of vehicular motion is accomplished. Thus, with clockwise rotation of the wheel and actuation of the units when traveling from 9 o'clock through 12 o'clock to 3 o'clock, the vehicle is moving horizontally to the left. By changing the actuation so it occurs when the units travel from 3 o'clock through 6 o'clock to 9 o'clock the vehicle may be slowed down, stopping and caused to travel in the reverse direction.

It will also be evident that a single wheel 20 may be mounted in any plane, vertical, horizontal, or inclined in any direction, that the wheel may be axially rotated in either direction, and that the actuation of the thrust producing units 30 may be varied to give the thrust in whatever direction it is desired. Further, the wheel may be mounted in a sphere, on gimbals, or in any other suitable support so that the plane in which the rotation of wheel 20 occurs may be varied in three dimensions at the will of the operator. By the same token, a vehicle may be equipped with a plurality of systems of this invention whereby the thrust from the thrust producing units on a plurality of wheels 20 may be exerted in a single selected direction to achieve greater force or may be exerted in two or more directions simultaneously in order to achieve changes in direction, modifications in speed, or the like.

Still another aspect of this invention is that it is susceptible to considerable latitude in engineering design and details. To illustrate, the system depicted in FIGS. 1 through 5 involves use of five electric motors to produce the desired rotations. Although the paired motors (i.e., the motors performing the same functions on the respective thrust producing units) will preferably be operated at about the same speeds, considerable variability in speeds among the motors 23, 32, and 38 is possible. The chief requirements in this regard are that motor 32 rotates fast enough to give a useful "gyroscopic-type" condition (e.g., from about 2,000 to about 20,000 r.p.m.), that motor 38 have a satisfactorily high rate of acceleration so that it may quickly go from 0 r.p.m. to the speed at which it is to operate during the desired position of each revolution of wheel 20 (this in turn being related to the speed at which wheel 20 is rotated), and that motor 23 turn wheel 20 fast enough (e.g., 200 to 2,000 r.p.m.) that a sufficient reactionary thrust is obtained during operation of the respective thrust producing units 30. In this same connection, it is evident from FIG. 4 and the discussion presented above in relation thereto that during normal operation of the vehicle (i.e., when not using the thrust producing units as a source of vehicular braking or the like) it is desirable that spindle 35 be axially rotated at least one-half of a revolution per one-half revolution of wheel 20. In actual practice spindle 35 may make as many as about five or more revolutions during a one-half revolution of wheel 20. Further, it is not necessary to rotate spindle 35 during a full one-half revolution of wheel 20. For example, rotation of the spindle only between 315° and 45° per the illustration of FIG. 4 will provide useful unidirectional thrust even though the spindle is thus rotating less than half of the time.

In the case of the system depicted in FIGS. 6 and 7, the energy is supplied to one motor and two electromagnetically operated clutches. This system is depicted as having a gear ratio of 1:1 throughout (so that one revolution of wheel 20 is accompanied by one revolution of each flywheel 53 and one complete oscillation by each weight 50) and this is the preferred arrangement for this system. However, the system may be geared so that these weights oscillate more rapidly relative to rotation of wheel 20 so long as each weight 50 is being rotatably moved away from the direction of the desired thrust when its respective clutch 75 is disengaged. Thus, these weights may make as many as about five oscillations per revolution of wheel 20. Just as in the case of the thrust producing units of FIGS. 1 through 5, the reaction occurring when weight 50 is sliding against the direction of its rotation while its clutch 75 is disengaged is dissipated in rotation of wheel 20.

While the clutches 75 as depicted are electromagnetically actuated, they may be mechanically or hydraulically actuated in any suitable fashion. Similarly, although electrical and mechanical means are shown in the Figures for driving the other movable elements, use may be made of other suitable means such as hydraulic systems or the like. Other variations and modifications for use in practicing this invention will become evident to those skilled in the art from a consideration of this disclosure and the accompanying Figures.

It is worth noting that both of the illustrative embodiments depicted in the drawings involve the principle and utilization of recirculating masses—i.e., masses are moved in cyclical paths, the inertia wheels 31 orbiting spindle 35 and the weights 50 oscillating back and forth in the tracks defined by guide rails 51,52. Moreover, these recirculating masses revolve around a central axis—the axis of rotation of wheel 20.

It is apparent that there are two chief requirements for achieving propulsion in accordance with the systems described above. First, the action-reaction producing the unidirectional thrust takes place during one-half or less of the rotation of wheel or disc 20. Secondly, the action begins and terminates on the wheel or disc 20 at a location away from its axis. Accordingly, the wheel 20 provides a moving platform or reference point against which the force can be exerted. Therefore the reaction which results when a weight is accelerated with respect to the wheel or disc exerts a push about which the axis or hub of the wheel or disc may swing and advance its position.

As an example of the practice of this invention, a device was constructed generally as shown in FIGS. 1-3. Wheel 20 was approximately 16 inches in diameter, the inertia wheels 31 were about 2.5 inches in diameter and each weighed about 32 grams. Five model slot racing car motors were employed, one turned wheel 20 at about 375 r.p.m., two rotated their respective inertia wheels at 12,000 r.p.m. and the remaining two alternately rotated their respective spindles 35 during one-half revolution of wheel 20. The vehicle readily traveled across flat surfaces at approximately 4 m.p.h. even though devoid of drive wheels in the usual sense.

For operation at considerable rotational velocity it may be desirable to equip the system with means to achieve and maintain balance. For example, auxiliary weights may be controlled to extend and retract in a phased fashion from the center out toward the periphery of the arm, wheel or disc 20. These auxiliary weights would serve as a neutral system as far as propulsion goes, neither helping non hindering propulsion, but rather, keeping the arm or disc in dynamic balance. This balancing arrangement can be used on both versions of the thrust generators depicted in the drawings.

Still another variation to which this invention is susceptible involves the use in a system such as depicted in FIGS. 6 and 7 of other forms of weights for producing the desired thrust. Thus in lieu of the slidable weights 50, use may be made of rotatable eccentric weights, flywheels, electric motors, as well as many other types of masses capable of being suitably moved at the proper time so as to produce the proper action-reaction couple at a locus remote from the central axis about which the weights are travelling. By way of illustration, electric motors may be slidably mounted near the periphery of wheel 20 and actuated so that they force themselves to slidably move in relation to a fixed point (e.g., a peg) on the wheel, the character of this motion in relation to the operation of clutch 75 otherwise being analogous to the system depicted. It will be noted that in this variant the electric motor itself serves as the weight and causes itself to be thrusted forward or backward relative to the fixed point on the wheel by means of suitable connecting rods or other linkage to the peg or like member.

The operation of the clutches 75 in systems of the type of FIGS. 6 and 7 is another area in which variations may be made. For example, in a two clutch system, the system may be started up with both clutches engaged or disengaged and the system put into proper alignment without producing any appreciable unidirectional motion. Then the clutches may be alternately disengaged during the same 180° of rotational travel of their respective thrust producing units so that the unidirectional motion is acquired. If desired, periodically, or at times selected by the operator, both clutches may be kept engaged for a given number of rotations by the wheel 20. Alternatively, both clutches may be disengaged for a given number of rotations and then regular unidirectional thrust producing operation resumed. In short, the systems have built-in flexibility.

It will of course be evident that for best results the system depicted in FIGS. 6 and 7 should be adjusted and operated such that weight 50 reaches the mid point of its acceleration stroke when wheel 20 has carried that weight 90° from the desired line of unidirectional travel. For example, where thrust in the direction of T is desired and wheel 20 is being rotated in the direction of R and where clutch 75 is being disengaged during the top 180° of rotational travel by the wheel, the slidable movement of weight 50 should be phased with its rotation so that it reaches the mid point of its slidable travel along guide rails 51,52 when it is at the apex of the rotation (i.e., when it is at 0°). Auxiliary controls for accomplishing this may be employed, if desired.

The propulsion systems of this invention may be employed in any of a wide variety of applications. For example, they may be used to move vehicles or loads on solid surfaces, on or under liquid surfaces or through gaseous media or evacuated space. Thus, the invention may be utilized in automobiles, trucks, buses, motorcycles, tractors, military vehicles (tanks, self-propelled artillery, etc.), self-propelled power equipment (cranes, road graders, etc.), trains, lawnmowers, ocean liners, boats, space craft, hovercraft, ground effect machines, aircraft, and the like.

What is claimed is:

1. A system for converting rotary motion into unidirectional motion which comprises:
   a. a wheel rotatable about an axis;
   b. thrust producing means carried by and rotatable with the wheel and exerting, when actuated, a thrust in a direction generally opposite the direction of its rotational travel; and
   c. means alternately actuating and deactuating the thrust producing means to yield thrust in the direction selected for the unidirectional motion of the system.

2. The system of claim 1 wherein the thrust producing means are positioned in proximity to the periphery of the wheel.

3. The system of claim 1 wherein the trust producing means comprise a plurality of thrust producing units positioned at essentially equal angular intervals on the wheel in proximity to its periphery and wherein each such unit is equipped with its own means alternately actuating and deactuating the unit, each such means actuating its own unit when the arcuate travel of the unit with the wheel is away from the direction selected for the unidirectional motion of the system.

4. The system of claim 3 further characterized in that there are two said units positioned at 180° intervals on the wheel.

5. The system of claim 1 wherein said thrust producing means comprise two thrust producing units positioned at 180° intervals on the wheel.

6. A system for converting rotary motion into unidirectional thrust which comprises:
   a. a disc rotatable about the center;
   b. means for rotating said disc;
   c. a plurality of biaxial rotational units positioned in proximity to the periphery of the disc and spaced at essentially equal angular intervals on its circular face, each said unit including
      1. a first rotatable shaft parallel to the radius of the disc,
      2. a second rotatable shaft, and and
      3. an inertia wheel carried by and rotatable with said second shaft, and
   4. means for axially rotating said second shaft, said second shaft being operatively carried by and rotated with said first shaft such that the second shaft describes, as it travels 360° about the longitudinal axis of the first shaft, a circle which falls in a plane essentially perpendicular to the circular face of said disc; and
   d. means axially rotating said first shaft when the biaxial rotational unit which includes said shaft is being carried by the rotating disc in an arcuate path away from the direction selected for the unidirectional thrust of the system, said means failing to rotate said first shaft when said unit is being carried by said disc in an arcuate path toward said direction.

7. A system for converting rotary motion into unidirectional thrust which comprises:
   a. at least one thrust producing units;
   b. means carrying said unit in an orbit around a common axis; and
   c. means causing each said unit to produce unidirectional thrust during all or a portion of the time it is orbiting in the semi-circle leading away from the direction in which the unidirectional thrust is desired and causing each said unit to not produce unidirectional thrust during the time it is orbiting in the semi-circle leading toward the direction in which the unidirectional thrust is desired.

8. The system of claim 7 further characterized by having a plurality of said units positioned at approximately equal angular intervals of the orbit.

9. The system of claim 7 further characterized by having a plurality of said units positioned at approximately equal angular intervals of the orbit, each said unit including (1) a movable weight, (2) a source of kinetic energy positioned in proximity to the orbit and away from the common axis and (3) means causing said weight to accelerate in the direction of orbital travel during approximately all of the time its unit is orbiting in the semi-circle leading away from the direction in which the unidirectional thrust is desired and causing said weight to decelerate in the direction of orbital travel during approximately all of the time its unit is orbiting in the semi-circle leading toward the direction in which the unidirectional thrust is desired, the kinetic energy utilized by said means in effecting the acceleration of the weight being derived from said source.

10. The system of claim 9 further characterized in that said source is a freely rotating inertia wheel.

* * * * *